Figure 1:
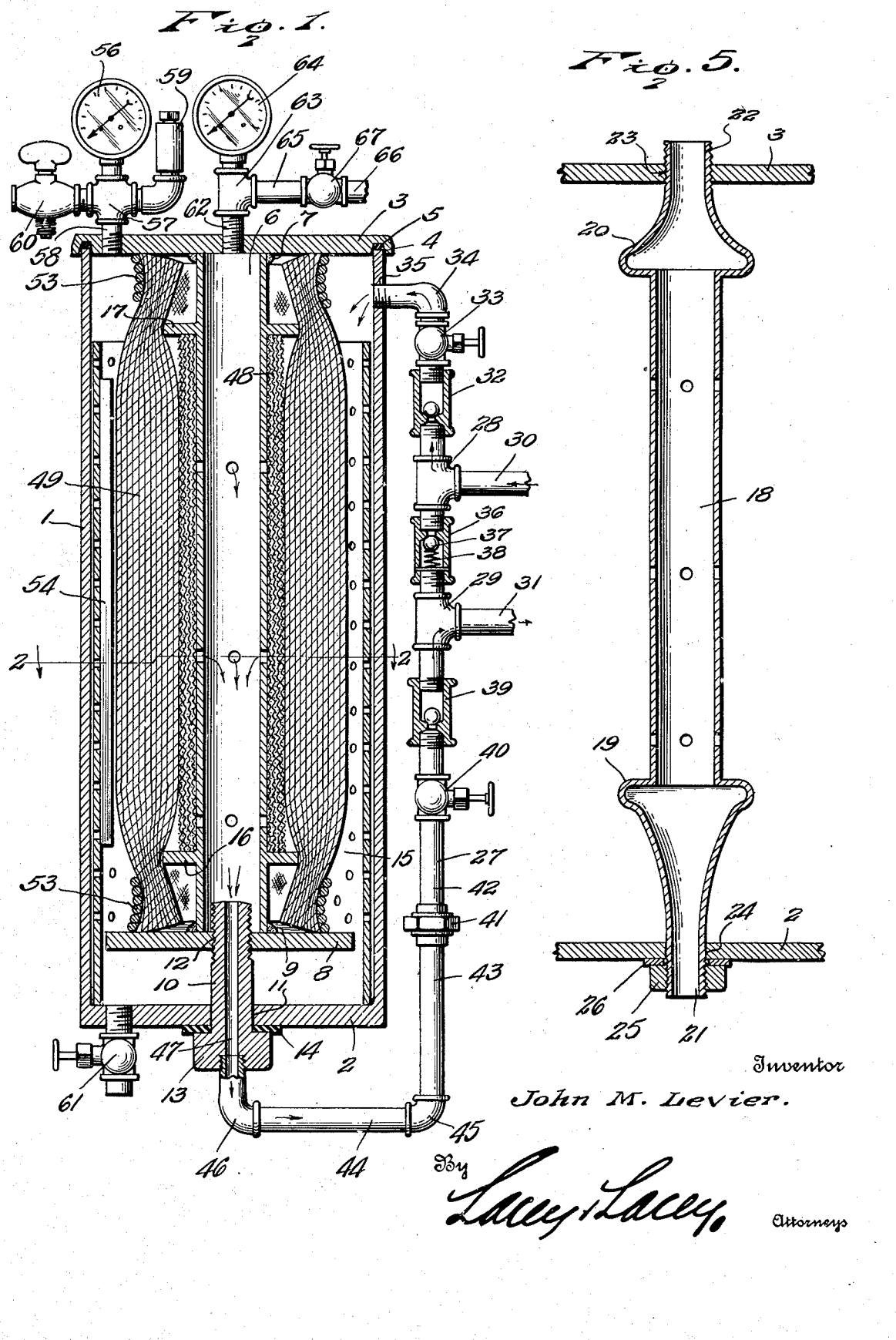

Dec. 26, 1944.   J. M. LEVIER   2,365,766
OIL FILTER
Original Filed Feb. 23, 1937   2 Sheets-Sheet 2

Inventor
John M. Levier.
By Lacey & Lacey
Attorneys

Patented Dec. 26, 1944

2,365,766

UNITED STATES PATENT OFFICE 2,365,766

OIL FILTER

John M. Levier, Anaheim, Calif., assignor to Oscar H. Levier, Arlington, Calif.

Continuation of application Serial No. 127,307, February 23, 1937. This application April 10, 1939, Serial No. 267,130

11 Claims. (Cl. 210—183)

This invention relates to filtering means and relates more particularly to filters for clarifying liquids such as oils, etc. A general object of this invention is to provide a simple, practical and particularly effective filter.

This application is filed as a continuation of and a substitute for my application for United States Letters Patent Serial No. 127,307, filed February 23, 1937.

Another object of this invention is to provide a filter that is effective in removing solid matter particles and other material from lubricating oils, for example, from the lubricating oils employed in the crank cases of internal combustion engines.

The oil filters used in connection with internal combustion engines are of three general types, namely:

(1) The discardable type that is discarded in its entirety when it becomes clogged, to be replaced by a new or replacement filter;

(2) The removable cartridge type comprising a permanent housing and a cartridge that is discarded and replaced when clogged;

(3) The repackable type, including a permanent housing and a special filter mass or filter cartridge that requires special skillful repacking. This last named type (3) filter is expensive and its efficiency depends upon the care and skill with which it is repacked. In the three general types of filters referred to factory replacements are necessary and the filters are a constant source of expense.

Another object of this invention is to provide an improved oil filter that remains operative and effective for a long period and is adapted to be easily and quickly cleaned and reconditioned for continued, fully effective operation without detachment or dismantling and without the replacement of parts.

Another object of this invention is to provide an oil filter of the character mentioned embodying a novel efficient filtering element that subjects the liquid or oil to a progressive filtering action to assure the filtration or removal of particles of dust, metal, carbon, dirt, etc. of various sizes.

Another object of this invention is to provide a filter of the character mentioned embodying a filtering element that is long wearing and that is adapted to be cleaned from time to time without removal from the body or case by introducing air, steam, or other fluid under pressure into the filter tube and after repeated cleaning by the fluid pressure the filtering element may be removed from the case and more thoroughly cleaned by subjecting it to a solvent bath, or the like, to remove all accumulated wax, and the like, to condition it for further extended use. The improved filtering element provided by the present invention may be cleaned from time to time by introducing a cleaning medium or fluid under pressure into the filter and may be removed from the case after extended use and after repeated cleaning by the fluid pressure to be thoroughly cleaned and reconditioned for further extended use. The ease and simplicity with which the filtering element may be cleaned and the durability of the filtering element promotes the general economy in the use of the filter and assures the thorough filtering of the oil throughout greatly extended periods of operation of the filter.

Another object of this invention is to provide a filter of the character mentioned embodying a filtering element comprising a tubular spirally wound fabric strip having sections whose mesh is graduated from the periphery of the element inwardly to its inner wall, with the mesh reduced in an inward progression, and the filter further includes means for causing a distributed flow or movement of the oil inwardly through the filtering element to be subjected to the progressive filtering action of the graduated fabric mesh and has means for introducing a cleaning fluid under pressure to the interior of the filtering element to expand the same through the pressure action and to drive out and wash away the accumulated particles of filtered-out material, driving such material outwardly through the expanded mesh and the expanded separated layers of the filtering element. The liquid or oil being filtered flows or moves inwardly through the superimposed layers of fabric whose mesh is graduated so that the suspended matter in the liquid is effectively filtered out and the air, steam, or other fluid under pressure admitted to the interior of the filtering element serves to free the matter thus collected by the fabric and drives the particles outwardly through the graduated fabric mesh of outwardly increasing size to effectively remove such particles from the filtering element.

Another object of the invention is to provide an oil filter in which the rate of filtration may be regulated and related to the rate of oil flow to maintain the rate of filtration in excess of the rate of contamination.

Another object of the invention is to provide a filter of the character mentioned embodying means for visibly indicating the condition of the filtering element throughout the operation of the filter.

Another object of this invention is to provide a filter of the character mentioned that includes novel means for removably securing the filtering element in its liquid passing and filtering position in such a manner that the liquid or oil cannot leak through the ends of the unit and cannot channel through the filtering element.

A further object of this invention is to provide an oil filter of the character mentioned including simple, effective means for conducting the liquid or oil to and from the filter case which means includes a by-pass system for by-passing liquid around the filter when the liquid is supplied in excess quantity or under excess pressure and when the flow through the filter is diminished or cut off because of the accumulated matter in the filtering element and during reconditioning and replacing of the filtering element.

Another object of this invention is to provide a filter of the character referred to in which the filtering element may be formed of inexpensive material to be discarded after a suitable period of use or may be formed of more expensive and more effective material to be durable and capable of repeated reconditioning and cleaning.

Another object of this invention is to provide a filter of the character mentioned that is simple and compact and that is easy to install and recondition.

Figure 2:
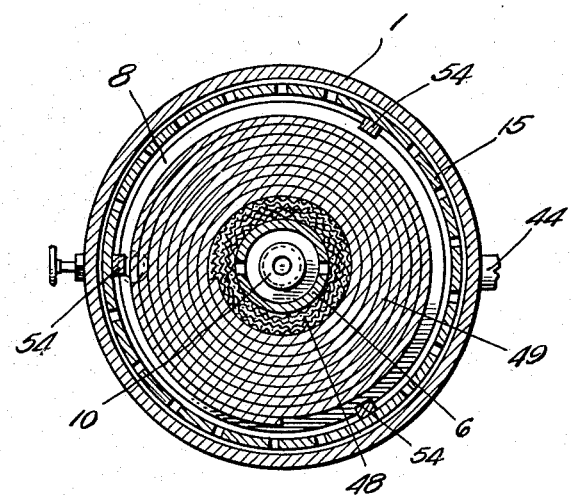
Figure 3:
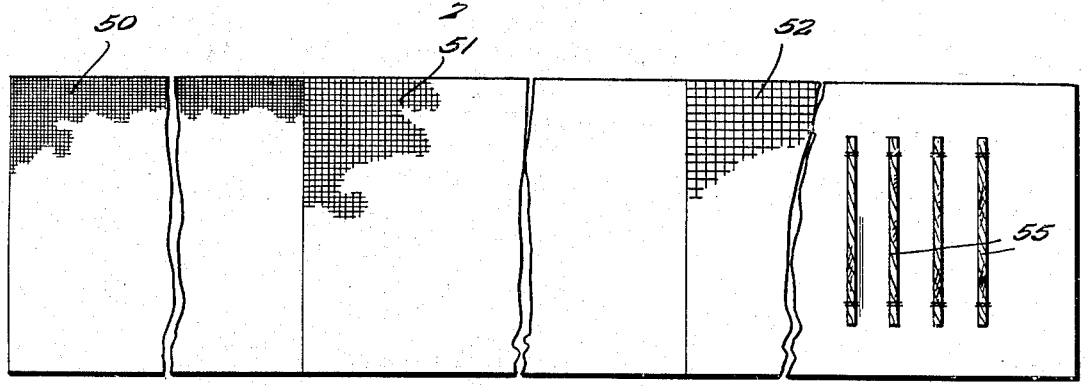
Figure 4:
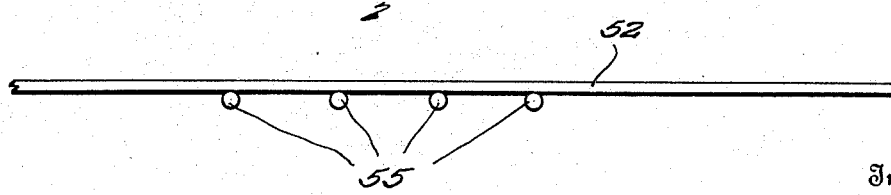

The various objects and features of my invention will be fully understood from the following detailed description of typical preferred forms and applications of the invention, throughout which description reference is made to the accompanying drawings, in which:

Fig. 1 is a central longitudinal detailed sectional view of the improved filter of the present invention with certain of the fluid conducting elements in side elevation. Fig. 2 is a transverse detailed sectional view taken substantially as indicated by line 2—2 on Fig. 1. Fig. 3 is an elevation view or plan view of the filtering element in a flat condition. Fig. 4 is an enlarged fragmentary edge elevation of a portion of the filtering element and Fig. 5 is an enlarged fragmentary longitudinal detailed sectional view illustrating a modified form of liquid-receiving tube.

The improved filter of the present invention may be said to comprise, generally, a body or casing 1, a core or tube 6 in the casing 1 for receiving the filtered liquid, a filtering element 49 around the tube 6, means for conducting fluid to and from the casing 1 to be filtered by the element 49 and means for introducing air or other fluid under pressure to the tube 6 to remove accumulated foreign matter from the filtering element 49 and the casing 1.

The body or casing 1 contains the filtering element 49 and serves to support the various other parts of the device. In the construction illustrated the casing 1 is an elongate cylindrical member closed at its lower end by an integral lower wall or bottom 2 and closed at its upper end by a removable head or cover 3. A groove 4 in the lower side of the cover 3 may receive the upper edge portion of the casing 1 to locate and centralize the cover 3. Where this construction is employed a sealing ring or gasket 5 may be arranged in the groove 4 to seal with the upper end of the casing 1. The casing 1 is, of course, fluidtight and pressuretight except for the fluid handling connections to be later described.

The core or tube 6 forms a carrier or support for the filtering element 49 and serves to receive the filtered liquid or oil from the filtering element. The tube 6 is preferably arranged centrally and longitudinally in the casing 1 and is provided with circumferentially and longitudinally spaced ports or perforations for admitting or passing fluid. In the particular construction illustrated in the drawings the upper end of the tube 6 is secured to the casing cover 3 so that the tube may be removed from the casing together with the cover. Brazing or welding may secure the tube 6 to the cover 3 as shown at 7. The tube 6 is preferably of substantial length and may extend downwardly through the casing 1 to have its lower end in spaced adjacent relation to the bottom 2. A baffle or disc 8 is provided on the lower end of the tube 6. The disc 8 may be secured to the tube 6 in any selected manner. In the construction illustrated brazing or welding 9 serves to attach the disc 8 to the lower end of the tube 6. A central longitudinal opening 12 in the disc 8 communicates with the lower end of the tube 6.

In accordance with the invention longitudinally spaced flanges 16 and 17 are provided on the tube 6. The flanges 16 and 17 are spaced a substantial distance apart being on the lower and upper end portions of the tube, respectively. The flanges 16 and 17 are annular or cylindrical and are preferably of the same diameter. As will be later described, the flanges 16 and 17 serve to carry the filtering element 49 and to close the ends of the element. The fluid passing perforations of the tube 6 are confined to the central portion of the tube, that is, to the portion of the tube lying between the spaced flanges 16 and 17.

The filtering element 49 is an important feature of the invention. The element 49 is provided to remove or filter out particles of solid matter and other filterable matter from the oil or liquid handled by the device. In accordance with the invention the filtering element 49 operates to subject the liquid to a stage filtration or a progressive filtering action and is capable of being expanded and freed of a large proportion of the filtered-out material by air, steam or other fluid under pressure supplied to its interior. The filtering element 49 is a tubular member or assembly arranged around the tube 6 in substantially concentric relation thereto to filter or act on the liquid passing from the casing 1 inwardly into the tube 6.

In accordance with the invention the filtering element 49 is in the nature of an elongate strip or assembly of fabric spirally wound or wrapped to form a tube. The fabric strip comprising the filtering element 49 is sectional embodying portions or sections of fabric of different mesh. In the particular embodiment of the invention illustrated the filtering element 49 includes three sections 50, 51 and 52. The fabric sections 50, 51 and 52 are preferably connected or secured together, for example, they may be stitched together so that the filtering element forms a continuous elongate fabric strip. The character and relationship of the fabric sections 50, 51 and 52 of the element 49 are important. The element 49 is wrapped or wound so that the section 50 provides its inner wrappings or convolutions and the section 51 forms its intermediate convolutions and the section 52 forms its outer convolutions. The sections 50, 51 and 52 may be substantially equal in length although this relationship may be varied as desired. The fabric sections 50, 51 and 52 are formed of fabric of graduated mesh, the sections 50 being formed of fabric of fine mesh, the section 51 being formed of fabric of somewhat coarser mesh, and the section 52 being formed of fabric of a still coarser mesh. The filtering action of the sections 50, 51 and 52 depends to some extent upon the nature of the fabric weave, the fabric texture and the nature of the fibers of the fabric, and where I herein describe the fabric as being a fine, intermediate, and coarse mesh it is to be understood that the term mesh is to be construed as meaning not only the actual mesh of the fabric, but also the weave, texture and fiber of the fabric which give the fabric its characteristic filtering action. The innermost section 50 of the filtering element 49 is capable of filtering out the very fine particles of foreign matter, the section 51 is operable to filter out the particles of foreign matter of somewhat larger gauge while the outermost section 52 serves to filter out or retain the larger foreign matter particles.

The mesh of the sections 50, 51 and 52 is so graduated that the spirally wound sections arranged in the progression described above effectively trap or filter out practically all the foreign matter contained in the oil or liquid passed through the filtering element 49. The filtering element 49 is of substantial length to have a considerable number of convolutions, for example, in a typical installation it may have from 25 to 35 layers or convolutions. The filtering element 49 is reeled or wound to be of such external diameter that it may freely enter the casing 1 with suitable clearance. In accordance with the invention the filtering element 49 is of such width that it projects beyond the flanges 16 and 17 and in the construction illustrated the width of the filtering element substantially equals the length of the tube 6.

Where it is intended to repeatedly clean the filtering element 49 by the action of fluid under pressure admitted to the tube 6 and by repeated washings of the filtering element in suitable solvents it is preferred to construct the sections 50, 51 and 52 of woolen fabrics, for example, of pure woolen fabrics or fabrics containing but a very small percentage of fibers other than wool. Where the filtering element 49 is to have a shorter life and is intended for earlier replacement the fabric sections 50, 51 and 52 may be formed of cotton fabrics which may be suitably treated to be resistant to the action of the acids, etc. in the oil being handled.

The invention provides novel and effective means for removably securing the filtering element 49 around the tube 6. The upper and lower edge or end portions of the tubular element 49 project beyond the flanges 17 and 16 and bindings 53 of wire or strong cord are arranged about these projecting portions to secure the element 49 in its operative position. The bindings 53 preferably each comprise a plurality of wrappings tightly drawn about the element 49. The bindings 53 serve to tightly compress the filtering element 49 against the peripheries of the flanges 16 and 17 and compress the projecting end portions of the element 49 so that the layers or convolutions are in tight or close relation. It is preferred to arrange the bindings 53 in offset relation to the flanges 16 and 17 to hold the major portion of the filtering element 49 under a suitable tension so that it retains its tubular shape. The filtering element 49 is preferably proportioned so that its upper end is at or in contact with the cover 3 and so that its lower end engages the disc 8. With this arrangement the cover 3 and the disc 8 constitute supports for the filtering element 49 and prevent endwise distortion of the element. The bindings 53 wrapped about the end portions of the filtering element 49 as described above, effective prevent the entrance or excess leakage of the oil or liquid through the ends of the element into the tube 6 so that the oil is obliged to flow radially inward through the filtering element to the tube and prevent the air, steam or other cleaning fluid under pressure from escaping through the ends of the filtering element so that the cleaning fluid must pass outwardly through the fabric filtering element. The bindings 53 are easily applied and are such that they may be readily removed to permit removal of the element 49 from the tube 6.

The invention provides means at the interior and exterior of the filtering element 49 to stabilize and support the element and to assure the effective operation of the element. Metal or wire screening 48 is wrapped or arranged about the tube 6 to form a support for the interior of the filtering element 49 and to prevent the inner convolutions of the element from entering and clogging the perforations of the tube 6. The screening 48 may be spirally wound about the cover 6 and surrounds the portion of the tube between the flanges 16 and 17. If desired the screening 48 may be suitably permanently associated with the tube 6 and the inner layer of the element may be removably secured to the screening. A perforated tubular liner 15 may be provided in the casing 1 to surround the filtering element 49. The liner 15 loosely fits the casing 1 and may rest on its bottom 2. A plurality of longitudinally spaced transversely arranged spacers 55 may be provided on the outer end portion of the coarse fabric section 52 to be on the periphery of the element 49 when the same is assembled or wrapped. The spacers 55 may constitute lengths of rope stitched or otherwise secured to the filter section 52. The spacers 55 serve to space the filtering element 49 from the liner 15 and the casing 1 and are effective in holding the outer convolutions of the element against excessive and irregular expansion when fluid under pressure is forced outwardly through the element to clean the same. Spacing rods 54 may be inserted between the liner 15 and the periphery of the filtering element 49 to assist the spacers 55. The liner 15, the spacers 55 and the spacing rods 54 are not always essential in every application of the invention.

The means for conducting the liquid or oil to or from the filter casing 1 is operable to receive the fluid under pressure from the lubricant circulating system of an engine, or the like, and conduct it to the casing 1 and to receive the filtered oil or liquid from the tube 6 and return it to the engine. In accordance with the invention the oil or liquid is delivered to the interior of the casing 1 to flow or pass through the filtering element 49 and then leave the casing from the interior of the element 49 or the tube 6. In the drawings 30 designates a pipe conducting the liquid or oil from the lubricant circulatory system of an engine, or the like, and 31 designates a pipe for returning the cleaned or filtered oil to the engine. The liquid conducting means of the invention includes interconnected conduit assemblies, one assembly receiving the oil from the pipe 38 and delivering it to the casing 1, and the other receiving the filtered oil from the tube 6 and conducting it to the pipe 31. These conduit assemblies may, of course, be varied considerably in construction and arrangement without departing from the invention. In the case illustrated the first named conduit assembly comprises a suitable elbow 34 having one arm threaded in an opening 35 in the upper portion of the casing 1. A manually operable valve 33 is connected with the other arm of the elbow 34 and a T 28 is secured to the delivery pipe 30. A check valve 32 is interposed between the valve 33 and one arm of the T 28. The check valve 32 may be a ball check and operates to prevent a return flow of the liquid from the casing 1 to the pipe 30. It will be seen that the oil or liquid from the pipe 30 is conducted to the upper end portion of the casing 1 when the valve 33 is open. The valve 33 may be closed to cut off flow from the pipe 30 to the casing 1 when the filtering element 49 is to be cleaned, removed or replaced.

The second piping assembly or conduit assembly of the liquid conducting means includes what I will term a nipple 10 extending through an opening 11 in the casing bottom 2 and having its upper portion threaded in the opening 12 of the disc 8. An enlargement or head 13 is provided on the exposed outer end of the nipple 10 and a washer or gasket 14 is arranged between the head 13 and the casing bottom 2. The head 13 may be polygonal to be conveniently turned by a wrench. It will be seen that the head 13 may be turned to thread the nipple 10 so that the tube 6 and the cover 3 will be drawn downwardly to tightly and securely seat the cover on the casing 1. Reverse threading of the nipple 10 of course loosens and frees the assembly of the tube 6 and the cover 3. An elbow 46 is threaded in the lower end of the nipple 10 to receive the filtered oil from the opening 47 of the nipple and piping 44—45—43—42 connects the elbow 46 with one arm of a T 29 provided on the return pipe 31. A union 41 is connected in the piping just mentioned to facilitate the assembling of the piping and to facilitate the easy threading of the nipple 10. A manually operable valve 40 is connected between the pipe section 42 and the T 29 and is adapted to be closed to put the pipe 31 out of communication with the interior of the filter. A check valve 39 is connected or interposed between the valve 40 and the T 29. The valve 39 may be a ball check and operates to prevent a return flow or a reverse flow from the pipes 30 and 31 to the tube 6 and casing 1.

The inlet and discharge piping systems just described are connected by a valved by-pass to allow all or a portion of the liquid to by-pass the filter when the filtering element 49 becomes clogged or when the valves 33 and 40 are closed or when the oil is supplied to the filter at a high rate or excessive rate. This by-pass comprises a relief valve or by-pass valve 36 connected between the T 28 and the T 29. The valve 36 may be any suitable type of valve capable of providing for the flow of liquid from the pipe 30 to the pipe 31 when a predetermined pressure builds up in the pipe 30 and the communicating system. In the simple construction illustrated the valve 36 includes a ball 37 seating upwardly or toward the T 28 and a spring 38 urging the ball to its closed position. The spring 38 may be set or formed to urge the ball closed under any selected force. When pressure builds up in the line 30 due to closing of the check valve 32 by reason of back pressure in the filter or due to closing of the valve 33 the ball 37 is unseated and the liquid under pressure flows from the pipe 30 to the pipe 31. When this occurs the check valve 39 prevents the fluid under pressure from flowing to the nipple 10 and tube 6. In large filters the by-pass valve 36 may be set or adjusted so that a substantial proportion of the oil is normally by-passed from the pipe 30 to the pipe 31 and the residual oil flow is directed through the filter. In such an installation the said residual flow is great enough to overcome or nullify the contamination of the oil by the normal engine operation. The valve 33 may be partially closed or set to regulate the rate of oil flow through the filter and thus obtain the correct balance between the filtration rate and the by-pass rate.

The invention provides means for indicating the pressure in the casing 1 so that the condition and operation of the filtering element 49 may be ascertained without removing the element from the casing 1. A pipe or nipple 58 is threaded in an opening in the cover 3 and carries a cross 57. The cross 57 in turn carries a pressure gauge 56. The gauge 56 operates to indicate the pressure within the casing 1. One arm of the cross 57 carries a manually operable bleeder valve 60 for bleeding air from the casing 1, cross 57, etc. when the operation of the filter is initiated. The valve 60 is normally closed. Another arm of the cross 57 carries a relief valve or safety valve 59 designed to open and relieve the pressure in the casing 1 in the event that the pressure becomes excessive or dangerous.

It is an important feature of the invention that means is provided for cleaning or reconditioning the filtering element 49 while the same is within the casing 1. This means includes a nipple or pipe 62 threaded in an opening in the cover 3 to communicate with the tube 6. A T fitting 63 is provided on the pipe 62 and a pipe 65 extends from the fitting. The pipe 65 is controlled by a manual valve 67. The valve 67 is adapted to receive air or other fluid under pressure for cleaning the filtering element 49. As shown in Fig. 1, a pipe or line 66 leads to the valve 67 to deliver the air or other fluid under pressure to the valve. The line 66 may be connected with a source of air under pressure, steam pressure, or other fluid under pressure when the filtering element is to be cleaned. A pressure gauge 64 is preferably connected with the fitting 63 to indicate the pressure being applied to the filtering element 49 when the same is being cleaned or reconditioned. The gauge 64 also indicates the pressure in the tube 6 during operation of the filter. A drain cock or discharge cock 61 communicates with the lower end of the casing 1 to discharge the material blown or washed from the filtering element 49 and to discharge the cleaning fluid. The operation of cleaning and reconditioning the filtering element 49 will be more fully described.

Fig. 5 illustrates a modified construction embodying a tube 18 which may be substituted for the tube 6 described above. The tube 18 is perforated to pass fluid to and from the surrounding filtering element 49. Hollow enlargements or flanges 19 and 20 are provided on the opposite ends of the tube 18. The flanges 19 and 20 have the same function as the flanges 16 and 17 described above, that is, the end or edge portions of the element 49 are supported on the flanges 19 and 20 being tightly confined against the flanges by the bindings 53. In practice the flanges 19 and 20 may be integral with the tube 18. The flanges 19 and 20 taper outwardly to have reduced outer end portions. The outer end portion 22 of the flange 20 is threaded through an opening 23 in the cover 3. The reduced end portion 21 of the head 19 extends through an opening 24 in the casing bottom 2 and a nut 25 is threaded on its projecting part. A washer or gasket 26 is arranged between the nut 25 and the under side of the bottom 2. It will be seen that threading of the nut 25 against the gasket 26 and bottom 2 draws the tube 18 and the cover 3 downwardly and the nut may be threaded to tightly secure the cover 3 to the casing 1.

In the use or operation of the improved filter of this invention the liquid or oil from the pipe 30 discharges into the casing 1 from the elbow 34 and the clarified or filtered oil returns through the nipple 10 and the piping assembly 46—45—44—43—42 to the pipe 31. The flow of liquid or oil through the filter may be continuous. Liquid or oil discharged into the casing 1 from the elbow 34 flows or passes inwardly through the filtering element 49 and the metal screening 48 to the tube 6. During the passage of the oil through the outer section 52 of the element 49 the larger particles of solid matter and foreign material are caught or filtered out by the fabric section. As the oil continues inwardly through the element 49 smaller particles are filtered out by the section 51 and the smallest particles are filtered out by the innermost section 50. Thus the liquid or oil is subjected to a stage filtration or a progressive filtration action. It has been found that the filtering element 49 effectively clarifies the oil, operating to remove practically all suspended matter from the oil. A certain amount of the solid matter may settle from the oil into the lower portion of the casing 1 to be trapped below the disc 8 and some of the foreign material caught by the filtering element 49 may fall into the lower portion of the casing. During the normal operation of the filter the gauge 56 indicates the pressure in the casing 1 and the gauge 64 may indicate the pressure on the clarified oil in the tube 6.

By comparing the readings of the gauges 56 and 64 the pressure drop resulting from the filtration may be determined. When the filter reaches the normal operating temperature at the start of its operation the differential in pressure as indicated by the gauges 56 and 64 may be quite small and equals the pressure required to force the oil through the filter. As the dirt accumulates on the filtering element 49 the pressure differential increases. When the gauge 56 indicates a pressure equal to the pressure setting of the by-pass valve 36 the filter is no longer in effective operation and the filtering element 49 should be cleaned.

After a period of operation it may be necessary to clean or recondition the filtering element 49. In accordance with the invention this reconditioning may be performed without dismantling the filter and without removing the filtering element 49 from the casing 1. To clean or recondition the filtering element 49 while in the casing 1 the valves 33 and 40 are first closed to stop flow of liquid or oil through the filter. With the valves 33 and 40 closed the oil flows from the pipe 30 to the pipe 31 through the by-pass valve 36. Following the closing of the valves 33 and 40 the drain cock 61 is opened and a source of fluid under pressure is put into communication with the line 66. The fluid employed to clean or recondition the filtering element 49 may be air, steam, water, or any other selected cleaning fluid. The valve 67 may be opened to admit the fluid under pressure to the tube 6 and the gauge 64 may be read to determine the pressure on the fluid thus admitted to the tube 6. The cleaning fluid flows out through the perforated tube 6 and the wire mesh or metal screening 48 to the filtering element 49. The cleaning fluid under pressure in the interior of the tubular filter element 49 expands the filtering element and tends to free or separate the several convolutions of the element. The spacers 55 and the spacing rods 54 assure a distributed expansion of the peripheral portion of the element 49 and hold the element out of contact with the liner 15. The cleaning fluid under pressure passing outwardly through the filtering element 49 frees or loosens the accumulated particles filtered from the oil and carries these particles outwardly into the casing 1. It will be seen that the smaller particles in the fine mesh section 50 readily pass outwardly through the larger mesh sections 51 and 52 when loosened or freed by the cleaning fluid under pressure. In a like manner the somewhat larger particles freed from the section 51 readily pass outwardly through the coarse mesh section 52. The foreign matter driven from the filtering element 49, as just described, is free to discharge through the opened cock 61. In a like manner the solid matter that may have settled in the lower portion of the casing 1 discharges from the cock 61 together with the cleaning fluid. When the filtering element 49 has been effectively cleaned the source of cleaning fluid under pressure is disconnected from the line 66. In the event a liquid cleaning agent has been used it is desirable to connect a source of air under pressure with the line 66 to blow all residual cleaning liquid from the filter to prevent contamination and dilution of the oil. The valve 67 and the cock 61 are now closed. The valves 33 and 40 are then opened to re-establish the flow of fluid or oil through the filter and the bleeder valve 60 may be momentarily opened to bleed all air from the casing 1. The above described method of cleaning the filtering element 49 is easily and quickly carried out and is effective in conditioning the element for further use. The cleaning element 49 may be repeatedly cleaned in the manner just described.

When it becomes desirable or necessary to give the filtering element 49 a more thorough cleaning to remove waxy substances, etc. the valves 33 and 40 are closed so that the oil by-passes the filter and the union 41 is disconnected to permit the outward threading of the nipple 10 to free the tube 6 and the cover 3. The cover 3 carrying the tube 6 and the filtering element 49 is removed or disengaged from the casing 1 and the bindings 53 are loosened so that the filtering element 49 may be unwound. The filtering element 49 may then be thoroughly cleaned in any selected manner, for example, it may be cleaned by a solvent, or the like. The tube 6 and the screening 48 may be thoroughly cleaned and, if desired, the interior of the casing 1 and the other parts of the apparatus may be cleaned. The reconditioned and cleaned filtering element 49 may be rewound and secured in place by the bindings 53. In the event the element 49 requires replacement, the new or replacement element 49 may be wound about the tube 6 and secured in place by the bindings 53. The filter is then reassembled and put into use in the manner described above. When the filtering element 49 is formed of a good grade woolen fabric it may be repeatedly cleaned and reconditioned in the two manners described above.

Where I herein refer to the element 49 as formed of an "extensible fabric" it is to be understood that this term is to be construed as meaning a filtering material fabric capable of extension, elongation or expansion when subjected to the action of fluid pressure as distinguished from wire fabrics, and the like, which are capable of little or no extension or expansion by such action.

Having described only typical preferred forms and applications of my invention, I do not wish to be limited or restricted to the specific details herein set forth, but wish to reserve to myself any variations or modifications that may appear to those skilled in the art or fall within the scope of the following claims:

Having described my invention, I claim:

1. A re-useable filtering element for use in a filter for arresting solid matter particles carried by oil or other liquids comprising a continuous strip of non metallic extensible fabric graduated in mesh in a longitudinal direction and spirally wound into tube form to have the portions of finer mesh constitute its inner convolutions and the portions of coarser mesh form the outer convolutions so that liquid forced inwardly through the wound strip is subjected to progressive stage filtration and so that the arrested solid matter particles are stored in the strip, the wound strip being expansible when subjected to the action of fluid pressure admitted to its interior so that said stored particles are freed for dislodgement by said admitted internal fluid pressure.

2. In a filter for arresting solid matter particles carried by oil or other liquids, a perforate supporting tube, an elongate tube of extensible woven fabric spirally wound around the tube to form a filtering element for liquid forced inwardly to the tube, the strip comprising a section of coarse mesh constituting the outer portion of the element, a section of finer mesh constituting the intermediate portion of the element, and a section of finer mesh than the second named section constituting the inner portion of the element, at least one of said sections continuing through a plurality of convolutions of the spirally wound strip, the sections of graduated mesh operating to subject the liquid to stage filtration in which the large particles are arrested by the coarse mesh section, the particles of intermediate size are arrested by said second named section and the smaller particles are arrested by the last named section, and means confining the ends of the filtering element and allowing expansion of the other parts of the element by fluid under pressure introduced into the tube for the purpose of driving out the particles retained in the element.

3. In a filter of the character described, a casing, a re-useable tubular filtering element in the casing comprising a spirally wound strip of extensible non metallic fabric, the strip being graduated in mesh so that its outer convolutions are of coarser mesh than its inner convolutions, means for supporting the filtering element so that its major portion is expansible by internal fluid pressure, means conducting fluid to the casing to pass inwardly through the filtering element to be subjected thereby to stage filtration, means conducting the filtered fluid from the interior of the filtering element, and means for introducing a cleaning fluid under pressure to the interior of the filtering element to back wash and thereby expand and clean the element.

4. In a filter of the character described, a casing, a tubular filtering element in the casing comprising a spirally wound strip of extensible fabric, the inner convolutions of the element being of a finer mesh than the outer convolutions, means confining the end portions of the element to prevent the passage of fluid therethrough and supporting the major intermediate portion of the element for expansion by internal fluid pressure, means for conducting fluid to the casing to pass inwardly through the filtering element to be filtered thereby, means for conducting the filtered fluid from the interior of the filtering element, and means for introducing a cleaning fluid under pressure to the interior of the filtering element to expand the element and pass outwardly through the element to drive and wash out the filtered-out material from the element, the finer particles of said material trapped in said inner convolutions readily being driven outwardly through the expanded element.

5. In a filter of the character described, a casing, a tubular filtering element in the casing comprising a spirally wound strip of fabric, a support extending through the tubular element, annular enlargements on the support spaced inwardly from each end of the element, the element having end portions extending beyond the enlargements in spaced relation to the support, bindings around said extended end portions of the element to confine said portions against the enlargements to prevent the passage of fluid through the end portions of the element, said bound end portions of the element being free of the support so that the bindings maintain an axial tension on the element and compress the element against the margins of the enlargements, means for conducting fluid to the casing to filter through the element to its interior, and means for conducting the filtered fluid away from the interior of the element.

6. In a filter, a casing, a longitudinal support in the casing, an expansible tubular filtering element on the support comprising a spirally wound fabric strip, means for conducting fluid to and from the casing to filter inwardly through the normally contracted element, means for admitting fluid under pressure to the interior of the element to expand the element and dislodge the accumulated filtered-out material therefrom, and means spaced from the normally contracted element for preventing the periphery of the element from contacting the wall of the casing when said fluid pressure expands the element, the last named means comprising circumferentially spaced parts between the periphery of the element and the wall of the casing.

7. A filter comprising a casing, a removable closure for one end of the casing, a perforated tube carried by the closure and disposed in the casing, an outlet nipple connecting the tube with the opposite end of the casing to hold the closure in place, spaced flanges on the tube, a screen surrounding the portion of the tube between said flanges, filtering material wound around the screen with its end parts extending over said flanges to have free portions beyond the flanges, and bindings about the said free portions holding the filtering material compressed against the peripheries of the flanges, said free portions being clear of the tube to act as levers so that said bindings tightly compress the filtering material against the flanges.

8. A filter comprising a casing, a removable closure for one end of the casing, a perforated tube carried by the closure and disposed in the casing, a plate on the lower end of the tube, an outlet nipple threadedly engaged with the plate and cooperating with the opposite end of the casing to secure the closure on the casing and communicating with the tube to receive the fluid therefrom, a strip of filtering fabric wound around the tube between the closure and the plate, and means for introducing fluid to casing to filter through the fabric and then discharge from the nipple.

9. In a filter, a casing, a longitudinal support in the casing, an expansible tubular filtering element on the support comprising a spirally wound fabric strip, the mesh of said strip being graduated in size longitudinally of the strip with the coarsest mesh at the periphery of the strip and the finest mesh at the interior of the strip, means for conducting fluid to and from the casing to filter inwardly through said element so that it is subjected to stage filtration, means for admitting fluid under pressure to the interior of the element to expand the element and dislodge the accumulated filtered-out material from the expanded element, and means holding the periphery of the element spaced from the wall of the casing whereby said fluid pressure may expand the element.

10. In a filter, a casing, a perforated tube extending longitudinally in said casing, an outlet nipple leading from the lower end of said tube through the bottom of said casing, an elongate fabric strip member spirally wound around said tube, the mesh of said strip being graduated in size longitudinally of the strip with the coarsest mesh at the periphery of the strip and the finest mesh at the interior of the strip, a perforated liner for said casing, spacers between said liner and the fabric filtering member, means for admitting fluid to the casing to filter inwardly through the graduated strip member, and means for admitting air under pressure into the perforated tube whereby air may be directed outwardly through the filtering member for dislodging sediment adhering to the outwardly increasing mesh of the member.

11. In a filter, a casing open at its upper end, a cover for the open end of said casing, a perforated tube extending from said cover longitudinally in the casing in axial relation thereto with its lower end spaced from the bottom of the casing, an outlet nipple extending through the bottom of the casing and having threaded connection with the lower end of the tube, collars encircling said tube adjacent upper and lower ends thereof, screening surrounding the tube between the collars, a strip of fabric wound about the tube and screening to provide a tubular filtering member of fabric having its ends projecting beyond the collars, and binding means for the projecting portions of the tubular filtering member firmly securing the filtering member in place with portions thereof in close contacting engagement with margins of the collars.

JOHN M. LEVIER.